US009213837B2

(12) United States Patent
Richard et al.

(10) Patent No.: US 9,213,837 B2
(45) Date of Patent: Dec. 15, 2015

(54) SYSTEM AND METHOD FOR DETECTING MALWARE IN DOCUMENTS

(75) Inventors: Matthew Richard, Holden, MA (US); Jesse J. Lee, Allen, TX (US); Monty D. McDougal, St. Paul, TX (US); Randy S. Jennings, Plano, TX (US); William E. Sterns, Dallas, TX (US)

(73) Assignee: Raytheon Cyber Products, LLC, Herndon, VA (US)

( * ) Notice: Subject to any disclaimer, the term of this patent is extended or adjusted under 35 U.S.C. 154(b) by 0 days.

(21) Appl. No.: 13/312,767

(22) Filed: Dec. 6, 2011

(65) Prior Publication Data

US 2013/0145466 A1    Jun. 6, 2013

(51) Int. Cl.
  G06F 11/00   (2006.01)
  G06F 12/14   (2006.01)
  G06F 12/16   (2006.01)
  G08B 23/00   (2006.01)
  G06F 21/56   (2013.01)

(52) U.S. Cl.
  CPC .................. G06F 21/562 (2013.01)

(58) Field of Classification Search
  CPC .................................................. H04L 63/1416
  USPC ........................................................ 726/23
  See application file for complete search history.

(56) References Cited

U.S. PATENT DOCUMENTS

| 2006/0253578 A1 | 11/2006 | Dixon et al. |
| 2008/0313734 A1 | 12/2008 | Rozenberg et al. |
| 2010/0162400 A1 | 6/2010 | Feeney et al. |
| 2010/0192222 A1* | 7/2010 | Stokes et al. ............... 726/22 |
| 2011/0022559 A1* | 1/2011 | Andersen et al. .......... 706/47 |
| 2011/0247072 A1* | 10/2011 | Staniford et al. ........... 726/24 |
| 2011/0283359 A1* | 11/2011 | Prince et al. ............... 726/23 |
| 2011/0289582 A1* | 11/2011 | Kejriwal et al. ........... 726/22 |
| 2012/0304244 A1* | 11/2012 | Xie et al. ..................... 726/1 |
| 2013/0097705 A1* | 4/2013 | Montoro ..................... 726/24 |

FOREIGN PATENT DOCUMENTS

| WO | WO-2011041916 A1 | 4/2011 |
| WO | WO-2013/086179 A1 | 6/2013 |

OTHER PUBLICATIONS

Zacharias Tzermias; Combining Static and Dynamic Analysis for the Detection of Malicious Documents; Year: 2011; IEEE;pp. 1-6.*
Official Notice evidence US Application No. 20110197177.*
"About Code Papers Links", http://www.reconstructer.org/code.html, 2 pages, Printed Mar. 9, 2011.

(Continued)

Primary Examiner — Monjour Rahim
(74) Attorney, Agent, or Firm — Schwegman Lundberg & Woessner, P.A

(57) ABSTRACT

In one embodiment, a method includes identifying, using one or more processors, a plurality of characteristics of a Portable Document Format (PDF) file. The method also includes determining, using the one or more processors, for each of the plurality of characteristics, a score corresponding to the characteristic. In addition, the method includes comparing, using the one or more processors, the determined scores to a first threshold. Based at least on the comparison of the determined scores to the first threshold, the method includes determining, using the one or more processors, that the PDF file is potential malware.

20 Claims, 3 Drawing Sheets

(56) References Cited

OTHER PUBLICATIONS

"*YARA in a nutshell*", yara-project, A malware identification and classification tool, yara-project—Project Hosting on Google Code, http://code.google.com/p/yara-project/, 3 pages, Printed Mar. 9, 2011.

"International Application Serial No. PCT/US2012/068229, International Search Report mailed Feb. 19, 2013", 2 pgs.

"International Application Serial No. PCT/US2012/068229, Written Opinion mailed Feb. 19, 2013", 5 pgs.

Kittilsen, "Detecting malicious PDF documents", [Online] Retrieved From Internet: <http://brage.bibsys.no/hig/bitstream/URN:NBN:nobibsys_brage_28253/1/Jarle%20Kittilsen.pdf>.

"International Application Serial No. PCT/US2012/068229, International Preliminary Report on Patentability mailed Jun. 19, 2014", 7 pgs.

* cited by examiner

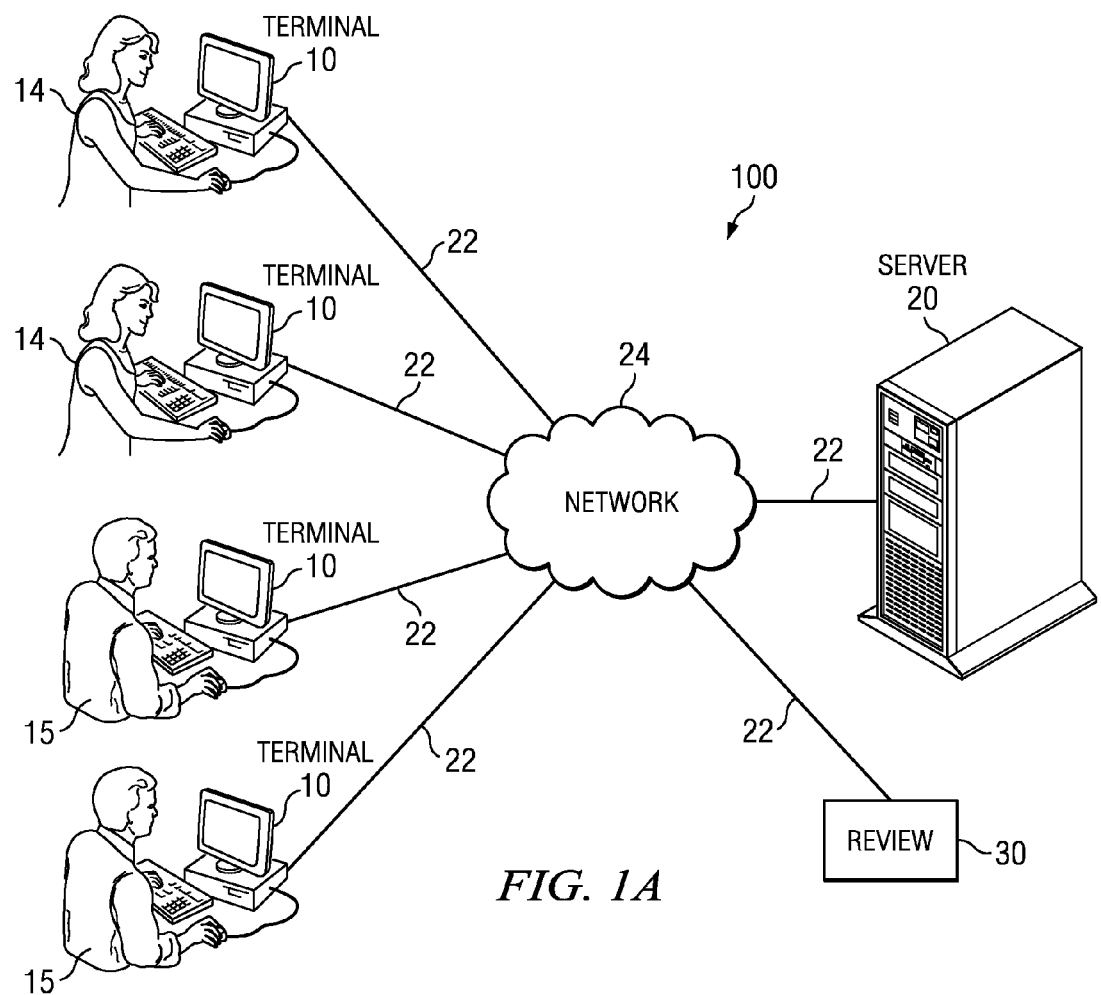
*FIG. 1A*
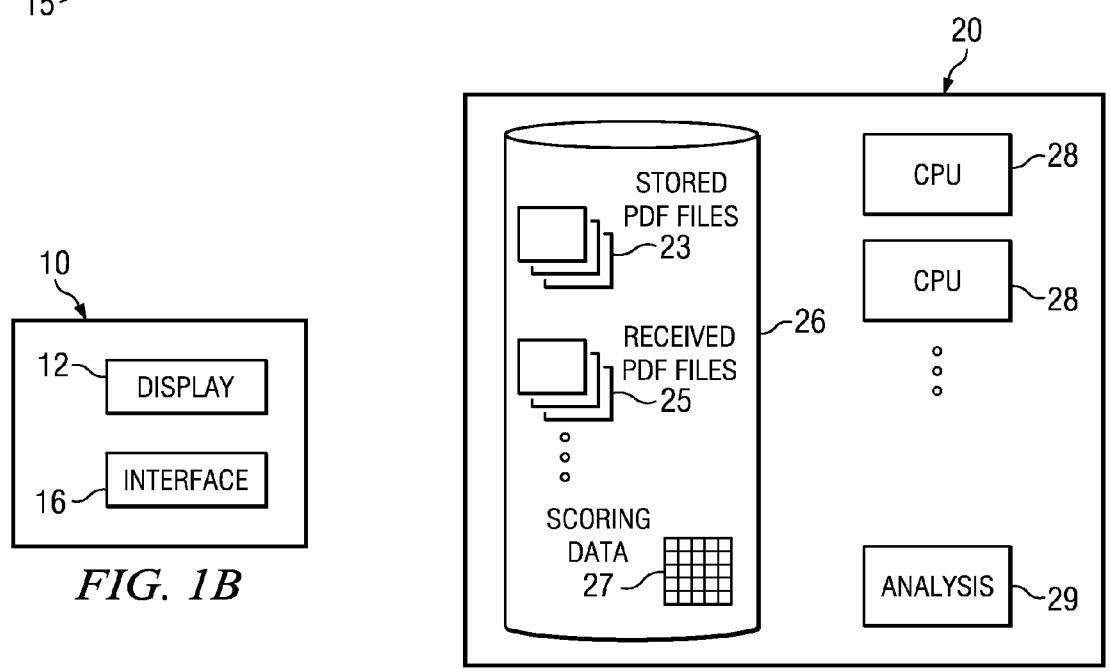
*FIG. 1B*
*FIG. 1C*

SYSTEM AND METHOD FOR DETECTING MALWARE IN DOCUMENTS

BACKGROUND

Malware (such as viruses, trojans, and other malicious software) has become increasingly difficult to protect against. Various methods have been used to combat malware but more sophisticated malware continues to abound. Malware has been included in often-used types of files, such as ADOBE PORTABLE DOCUMENT FORMAT (PDF) files. Some malware is difficult to detect using traditional methods because they are embedded in such files. This leaves systems vulnerable.

SUMMARY

In one embodiment, a method includes identifying, using one or more processors, a plurality of characteristics of a Portable Document Format (PDF) file. The method also includes determining, using the one or more processors, for each of the plurality of characteristics, a score corresponding to the characteristic. In addition, the method includes comparing, using the one or more processors, the determined scores to a first threshold. Based at least on the comparison of the determined scores to the first threshold, the method includes determining, using the one or more processors, that the PDF file is potential malware.

In some embodiments, the method may include comparing the determined scores to the first threshold and a second threshold. The PDF file may be determined to be potential malware by determining that the determined scores are less than the second threshold and greater than the first threshold. The plurality of characteristics may include one or more of the following: time zone, metadata, existence of Javascript, existence of Flash, language, font type, incorrect syntax, duplicate object numbers, embedded executables, and version. The method may include sending, in response to determining that the PDF file is potential malware, the PDF file, the plurality of characteristics, and the determined scores to a human review module for review by a human analyst in response to determining that the PDF file is potential malware.

In one embodiment, a system includes one or more processors configured to identify a plurality of characteristics of a Portable Document Format (PDF) file. The one or more processors are also configured to determine for each of the plurality of characteristics, a score corresponding to the characteristic. In addition, the one or more processors are configured to compare the determined scores to a first threshold and, based at least on the comparison, determine that the PDF file is potential malware.

Depending on the specific features implemented, some embodiments may exhibit some, none, or all of the following technical advantages. Potential malware may be detected that is embedded in PDF files. Detection of potential malware may be more robust by analyzing multiple characteristics of the PDF files. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which:

FIG. 1A illustrates an example system for detecting malware in documents;

FIG. 1B shows example contents of the terminal from FIG. 1A;

FIG. 1C shows example contents of the server from FIG. 1A;

DESCRIPTION OF EXAMPLE EMBODIMENTS

Figure 2:
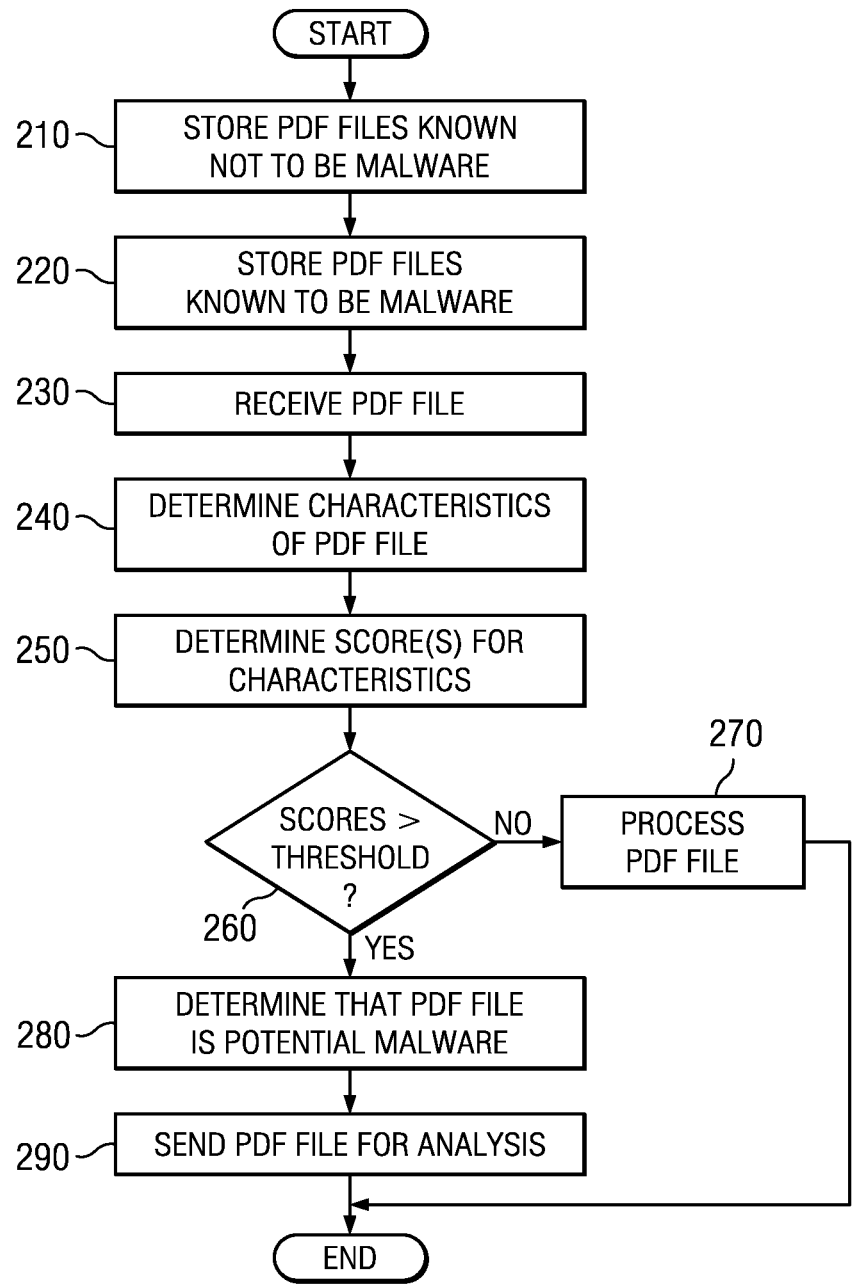
FIG. 2 is a flowchart illustrating one embodiment of detecting potential malware in PDF files.

FIG. 1A illustrates an example system 100 for detecting malware in documents. System 100 may facilitate communication in a network environment. Users 14-15 interact with server 20 through terminals 10. FIG. 1B is a diagram showing, in some embodiments, example contents of terminal 10. Terminal 10 comprises interface 16 (through which users 14-15 may interact with terminal 10) and display 12. FIG. 1C is a diagram showing, in some embodiments, example contents of server 20. Server 20 comprises memory 26, at least one central processing unit (CPU) 28 (and/or other suitable processor), and analysis module 29. Terminals 10, server 20, and review module 30 are communicatively coupled via network connections 22 and network 24. Analysis module 29 may be configured to analyze Portable Document Format (PDF) files 25 sent from users 14-15 and determine whether the received PDF files 25 are (or include) potential malware. Review module 30 may receive PDF files that have been determined by analysis module 29 to be potential malware and facilitate further review and analysis of the file (e.g., by a human analyst). In some embodiments, malware may include viruses, trojans, worms, spyware, adware, scareware, crimeware, rootkits, and other malicious software.

In some embodiments, users 14-15 are clients, human users, or other entities that participate in a communication session. Users 14-15 may communicate with other users via network 24. A communication session may include an e-mail session, an instant messaging session, a peer-to-peer messaging session, a chat session, or other messaging sessions. Aspects of system 100, in various embodiments, may also be used in contexts where files are uploaded. For example, some or all of system 100 may be utilized in File Transfer Protocol (FTP) sessions, Wiki sessions, online message boards (such as forums), or other interactive environments. Users 14-15 may also be browsing the Internet.

Terminal 10 may include any suitable type of processing device that is capable of receiving and/or storing PDF files. In some embodiments, terminal 10 represents a personal computer that may be used to access network 24. Alternatively, terminal 10 may be representative of a cellular telephone, an electronic notebook, a laptop, a personal digital assistant (PDA), or any other suitable device (wireless or otherwise: some of which can perform web browsing), component, or element capable of accessing one or more elements within system 100. Interface 16, which may be provided in conjunction with the items listed above, may further comprise any suitable interface for a human user such as a video camera, a microphone, a keyboard, a mouse, or any other appropriate equipment according to particular configurations and arrangements. In addition, interface 16 may be a unique element designed specifically for communications involving system 100. Such an element may be fabricated or produced specifically for matching applications involving a user.

Display 12, in some embodiments, is a computer monitor. Alternatively, display 12 may be a projector, speaker, or other device that allows users 14-15 to appreciate information that system 100 transmits.

Network 24 comprises one or more communicative platforms operable to exchange data or information emanating from users 14-15. Network 24 could be a plain old telephone system (POTS). Transmission of information emanating from the user may be assisted by management associated with server 20 or manually keyed into a telephone or other suitable electronic equipment. In other embodiments, network 24 could be any packet data network offering a communications interface or exchange between any two nodes in system 100. Network 24 may include any suitable combination of a local area network (LAN), metropolitan area network (MAN), wide area network (WAN), wireless local area network (WLAN), virtual private network (VPN), the Internet, intranet, and any other appropriate architecture or system that facilitates communications in a network or telephonic environment, including a combination of any networks or systems described above. In various embodiments, network connections 22 may include, but are not limited to, wired and/or wireless mediums which may be provisioned with routers and firewalls.

Server 20 is operable to receive and to communicate information to terminal 10. In some embodiments, server 20 may comprise a plurality of servers or other equipment, each performing different or the same functions in order to receive and communicate information to terminal 10. Server 20 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. In some embodiments, server 20 may comprise one or more clusters of virtual or hardware-based computing nodes, a distributed computing infrastructure, or other suitable forms of providing a software service using multiple computers. In some embodiments, server 20 may offer one or more services to users 14 and 15 via network 24 such as a messaging service, an e-mail service, an instant messaging service, a peer-to-peer messaging service, a chat service, an FTP service, a Wiki service, an online message board (such as a forum), or other interactive services.

In some embodiments, memory 26 may include multiple storage structures 27, one or file systems, as well as other suitable structures for storing and retrieving data. Memory 26 may include suitable combination of volatile or non-volatile memory. For example, storage structure 27 may be implemented using any suitable combination of one or more databases, file systems, tables, stacks, heaps, or other suitable storage structures.

In some embodiments, users 14-15, using terminals 10, may send or receive files, such as PDF files, via network 24 and server 20. For example, a user 14 may receive a PDF file sent from another user 15 via server 20. The sending user 15 may have created the PDF file such that it is malware. A PDF file considered to be malware may be a PDF file that includes malware. As described below, analysis module 29 may be used to determine whether the PDF file is potential malware. Analysis module 29 may access or be provided PDF files in any other suitable manner.

In some embodiments, analysis module 29 may be implemented using any suitable combination of hardware, firmware, and software. Analysis module 29 may be configured to analyze PDF files 25 sent or received by users 14 and 15 to determine whether the PDF files are potential malware. PDF files 25 received by server 20 that will be processed by analysis module 29 may be stored in memory 26. Analysis module 29 may store PDF files 23 known to be malware or known not to be malware in memory 26 when making such determinations.

In some embodiments, analysis module 29 may generate one or more scores for PDF file 25 sent or received by user 14 or 15 by comparing characteristics of the PDF file 25 to characteristics of PDF files 23 known to be malware and/or known not to be malware. The one or more scores may be compared to one or more thresholds, and PDF file 25 sent or received by user such score(s) and/or threshold(s) may be stored in storage structure 27 which contains scoring data. PDF file 25 may be determined to be potential malware based on this comparison. For example, if a score is higher than the threshold, then PDF file 25 may be determined to be potential malware. As another example, if the score is at or below the threshold, then PDF file 25 may be determined not to be potential malware. Analysis module 29 may be configured to cause a PDF file it determines to be potential malware to be sent to review module 30. Examples of how analysis module 29 may determine whether PDF files 25 submitted by users 14 and/or 15 are potential malware are discussed below with respect to FIG. 2. In some embodiments, analysis module 29 may automatically detect whether a PDF file 25 is potential malware without relying on pattern-matching techniques such as malware signatures. As another example, the use of analysis module 29 by server 20 may provide an advantage in that PDF files 25 that are or contain malware transmitted using services offered by server 20 may be identified and prevented from perpetrating malicious activity on server 20 or against users of server 20.

In some embodiments, analysis module 29 may be located in terminals 10 such that PDF file(s) 25 may be analyzed at a terminal 10. Memory 26 may be located at terminal 10 as well or memory 26 may be located at server 20. For example, if memory 26 is located at terminal 10, information used by analysis module 29 when analyzing PDF file 25 (such as characteristics of PDF files 23 known to be malware and known not to be malware) may be available at terminal 10. As another example, if aspects of memory 26, such as PDF files 23 known to be malware and known not to be malware, are stored on server 20, analysis module 29 located in terminal 10 may communicate with server 20 to receive information (such as characteristics of PDF files 23 known to be malware and known not to be malware) before or while analyzing PDF file 25 located at terminal 10.

In some embodiments, review module 30 may be implemented using any suitable combination of hardware, firmware, and software. Review module 30 may receive PDF files 25 determined to be potential malware by analysis module 29 as well as information used or generated by analysis module 29 when determining that PDF file 25 is potential malware. Review module 30 may provide access to PDF file 25 and this information to a human analyst. The information provided by review module 30 may include characteristics of PDF file 25 determined to be potential malware, scores generated for these characteristics, and information regarding the context in which PDF file 25 was found (e.g., original directory, network location, originator of the file, and e-mail message to which the file was attached). This may provide an advantage in that new malware techniques may be discovered by a human analyst. This may also provide an advantage because the human analyst may be able to determine that the PDF file is actually malware and system 100 may learn from the techniques used in the malware.

FIG. 2 is a flowchart illustrating one embodiment of detecting potential malware in PDF files using analysis module 29 of FIG. 1C. In general, the steps illustrated in FIG. 2 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1A-1C.

At step 210, in some embodiments, PDF files known not to be malware may be stored. For example, server 20 may receive PDF files in communications from users 14 of FIG. 1A. It may be determined that some or all of the PDF files submitted by users 14 are known not to be malware. In some embodiments, such a determination may be based on one or more malware detection schemes (e.g., signature scanning, heuristic analysis, and behavioral analysis), on a review of the PDF files by a human analyst, and/or on other factors. The PDF files known not be malware may be stored by server 20 of FIG. 1A. Examples of such files are PDF files 23 stored in memory 26 of FIG. 1C. In some embodiments, the PDF files may be processed before, during, or after being stored. For example, statistical analysis may be performed on characteristics of the PDF files known not to be malware. Data regarding statistical correlations may be generated as a result of processing the PDF files.

At step 220, in some embodiments, PDF files known to be malware may be stored. For example, server 20 may receive PDF files in communication from users 15 of FIG. 1A. It may be determined that some or all of the PDF files submitted by users 15 are malware. In some embodiments, such a determination may be based on one or more malware detection schemes (e.g., signature scanning, heuristic analysis, and behavioral analysis), on a review by an analyst of the PDF files, and/or on other factors. Examples of PDF files known to be malware include PDF files that include viruses, trojans, malware scripts, or other PDF files that perform undesired activity. The PDF files submitted by users 15 known to be malware may be stored by server 20 of FIG. 1A. Examples of such files are PDF files 23 that are stored in memory 26 of FIG. 1C. In some embodiments, the PDF files may be processed before, during, or after being stored. For example, statistical analysis may be performed on characteristics of the PDF files known to be malware. Data regarding statistical correlations may be generated as a result of processing the PDF files. Processing PDF files known to be malware using the techniques described above may provide an advantage because, in some embodiments, detection of potential malware in PDF files may be adaptable and learn from new malware techniques by processing more or newer PDF files known to be malware.

At step 230, in some embodiments, one or more PDF files are received at server 20 from a user, such as one of users 14 or 15. As examples, a user may submit a message or other communication that includes one or more PDF files. Server 20 may be configured to determine whether or not the PDF file(s) received at this step is suspected to be malware. Analysis module 29 of FIG. 1C may perform this determination. The PDF file(s) received at step 230 may be stored by server 20. Examples of such PDF file(s) are received PDF files 25 stored in memory 26 of FIG. 1C.

At step 240, in some embodiments, characteristics of the file(s) received at step 230 may be determined. This may be accomplished by analysis module 29 of FIG. 1C. Example characteristics that may be determined at step 240 include any suitable combination of the following: time zone, whether metadata exists, author, title, create date, tool used to create the PDF file, the existence of Javascript, functions used in Javascript present in the PDF file, the existence of ADOBE FLASH data, the existence of 3D media, the existence of audio data, the existence of video data, names and variables in rich content, language, font, glyph types, dynamic font types, the presence of markers between objects within a PDF file, multiple object numbers, version number, and structural tags. Additionally or alternatively, other suitable characteristics may be determined at this step. For example, such characteristics may be disclosed in one or more versions of the ADOBE PORTABLE DOCUMENT FORMAT SPECIFICATION GUIDE. As another example, such characteristics may be disclosed in the INTERNATIONAL STANDARDS OF ORGANIZATION (ISO) 32000-1:2008 document.

At step 250, in some embodiments, one or more scores may be determined for the characteristics determined at step 240. This step may be performed by analysis module 29 of FIG. 1C. The scores may be determined based on correlations between the PDF file(s) received at step 230 and the PDF file(s) stored at steps 210 and 220. The PDF files stored at steps 210 and 220 may be PDF files that have previously been analyzed. The results of such analysis may be used to analyze PDF file(s) received at step 230. For example, the characteristics may be compared using statistical correlations and the scores may be in proportion to the amount of correlation that exists between the characteristics determined at step 240 and the characteristics of the files stored at step 210 and 220. For example, a "random forest" algorithm may be used in determining the statistical correlations between the PDF file(s) received at step 230 and the PDF file(s) stored at steps 210 and 220. Scores may be determined for the characteristics based on the frequency with which each characteristic occurs in PDF files known to be malware or known not to be malware. For example, if the presence of Javascript is more frequent in PDF files known to be malware than the presence of 3D media, then the score determined for the presence of Javascript in the PDF file being scored will be greater than the score determined for the presence of 3D media in the PDF file being scored.

In some embodiments, a characteristic may be given a relatively higher score if the characteristic has a higher statistical correlation with PDF files that are known to be malware than with PDF files known not to be malware. If a characteristic has a higher statistical correlation with PDF files that are known not to be malware than with PDF files known to be malware, then a relatively lower score may be given to the characteristic. For example, characteristics that are more correlated with PDF files known to be malware than with PDF files known not to be malware may be assigned a positive score with the absolute value of the score being in proportion to the strength of the correlation with the PDF files known to be malware. As another example, characteristics that are more correlated with PDF files known not to be malware than with PDF files known to be malware may be assigned a negative score with the absolute value of the score being in proportion to the strength of the correlation with the PDF files known not to be malware. In some embodiments, the scores may be weighted. For example, the scores associated with certain characteristics may be weighted more than others because they may be a better indicator of whether a PDF file is potential malware or not.

In some embodiments, the following example characteristics may be determined to be more correlated with PDF files known to be malware than with PDF files known not to be malware: the existence of Javascript in the PDF file; the presence of specific Javascript functions; the existence of rich content; the existence of 3D media such as 3D renderings or CAD images; the existence of ADOBE FLASH objects; the existence of audio data; the existence of video data; the presence of embedded executables; the absence of some or all metadata; the presence of string patterns or markers at the beginning or end of one or more sections of the PDF file; the existence of markers between objects in the PDF file; multiple objects containing the same object number in the same PDF file; the use of dynamic font types; the existence of incorrect syntax; and the existence of multiple structural tags (e.g., end of file, headers, footers, cross reference tables). One or more of these example characteristics may not be more correlated with PDF files known to be malware than with PDF files known not to be malware in some embodiments.

In some embodiments, the value of some characteristics may be analyzed to determine whether the characteristic is more correlated with PDF files known to be malware or whether the characteristic is more correlated with PDF files known not to be malware. For example, the time zone found in the PDF file received at step 230 may have a higher statistical correlation with PDF files known to be malware than with PDF files known not to be malware. As another example, the value of certain aspects of metadata may also be more correlated with PDF files known to be malware or whether the characteristic is more correlated with PDF files known not to be malware such as the author, title, PDF version, and/or creation date. As another example, the type of language, font, or glyphs used in the PDF file may have a higher statistical correlation with PDF files known to be malware than with PDF files known not to be malware. The presence or absence of characteristics, the values of characteristics, and/or other aspects of the characteristics may be used to determine score(s) at step 250.

At step 260, in some embodiments, the score(s) determined at step 250 may be compared to one or more thresholds. This step may be performed by analysis module 29 of FIG. 1C. One or more scores determined at step 250 may be combined into an overall score at this step. For example, the scores may be summed. As another example, the scores may be averaged. As another example, the scores may be summed and normalized. If the overall score is greater than the threshold then step 270 may be performed. If the overall score is less than or equal to the threshold then step 280 may be performed. The threshold may be determined by a given set of tolerance parameters that may be configured to classify a PDF file as potential or suspected malware. For example, if the threshold is set higher, then there would be a correspondingly lower tolerance for determining that a PDF file is potential malware using the example scoring method discussed above. If the threshold is set lower, then there would be a correspondingly higher tolerance for determining that a PDF file is potential malware using the same example scoring method. The threshold may vary based on the context associated with the PDF file(s) received at step 230. For example, one threshold may be set if the PDF file was received as part of an email whereas another threshold may be set for a file that was downloaded from a local or corporate intranet.

In some embodiments, multiple thresholds may be used at step 260. For example, if an overall score of the scores determined at step 250 is below two thresholds or equal to the lower of the two thresholds, the PDF file may be determined not to be potential malware. In this example, if the overall score is between the two thresholds or equal to the higher of the two thresholds, the PDF file may be determined to be potentially malware. Further, if the overall score is above the two thresholds, then the PDF file may be considered as highly likely to be malware.

At step 270, in some embodiments, the PDF file(s) received at step 230 may be processed. This may occur because it has been determined that the PDF file(s) received at step 230 are not potential malware. The PDF file(s) may have been determined not to be potential malware by determining that score(s) generated for the PDF file(s) at step 250 are not greater than a threshold. Processing the PDF file(s) at this step may include different actions depending on the context associated with the PDF file(s) received at step 230. For example, if a PDF file received at step 230 is an attachment to an e-mail, then processing the PDF file at step 270 may include allowing the e-mail with the attachment to be delivered or received. If a PDF file received at step 230 was downloaded as part of a file transfer session, then processing the PDF file at this step may include allowing the PDF file to remain stored and not deleting the PDF file.

At step 280, in some embodiments, the PDF file(s) received at step 230 may be determined to be potential malware. This may be performed by analysis module 29 of FIG. 1C. For example, if the sum of the scores generated at step 250 was determined to be greater than the threshold at step 260, then the PDF file received at step 230 may be determined to be potential malware. At step 290, in some embodiments, PDF file(s) determined to be potential malware may be sent for further analysis. For example, the PDF file(s) may be sent to a human analyst for further analysis. Information generated or used in steps 210-260 may also be sent to a human analyst, such as scores generated at step 250, statistical correlation values, and characteristics determined at step 240.

Figure 3:
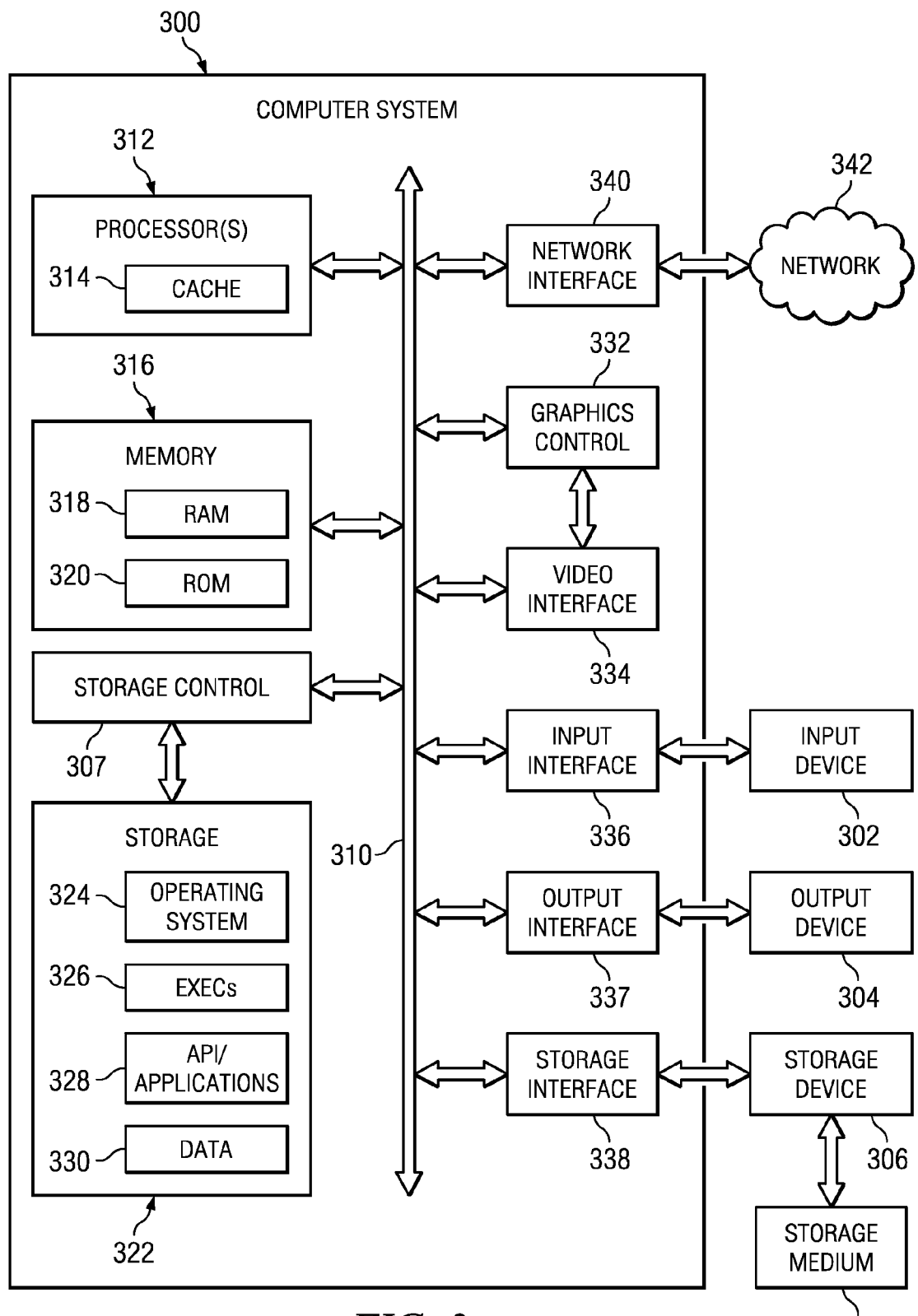
FIG. 3 illustrates an example computer system suitable for implementing one or more portions of some embodiments.

FIG. 3 illustrates an example computer system 300 suitable for implementing one or more portions of some embodiments. Although the present disclosure describes and illustrates a particular computer system 300 having particular components in a particular configuration, the present disclosure contemplates any suitable computer system having any suitable components in any suitable configuration. Moreover, computer system 300 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components of FIGS. 1A-1C and one or more steps of FIG. 2 may be implemented using all of the components, or any appropriate combination of the components, of computer system 300 described below.

Computer system 300 may have one or more input devices 302 (which may include a keypad, keyboard, mouse, stylus, or other input devices), one or more output devices 304 (which may include one or more displays, one or more speakers, one or more printers, or other output devices), one or more storage devices 306, and one or more storage medium 308. An input device 302 may be external or internal to computer system 300. An output device 304 may be external or internal to computer system 300. A storage device 306 may be external or internal to computer system 300. A storage medium 308 may be external or internal to computer system 300. In some embodiments, terminals 10 and server 20 of FIG. 1A may be implemented using some or all of the components described above included in computer system 300.

System bus 310 couples subsystems of computer system 300 to each other. Herein, reference to a bus encompasses one or more digital signal lines serving a common function. The present disclosure contemplates any suitable system bus 310 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 300 includes one or more processors 312 (or central processing units (CPUs)). A processor 312 may contain a cache 314 for temporary local storage of instructions, data, or computer addresses. Processors 312 are coupled to one or more storage devices, including memory 316. Memory 316 may include random access memory (RAM) 318 and read-only memory (ROM) 320. Data and instructions may transfer bidirectionally between processors 312 and RAM 318. Data and instructions may transfer unidirectionally to processors 312 from ROM 320. RAM 318 and ROM 320 may include any suitable computer-readable storage media.

Computer system 300 includes fixed storage 322 coupled bi-directionally to processors 312. Fixed storage 322 may be coupled to processors 312 via storage control unit 307. Fixed storage 322 may provide additional data storage capacity and may include any suitable computer-readable storage media. Fixed storage 322 may store an operating system (OS) 324, one or more executables (EXECs) 326, one or more applications or programs 328, data 330 and the like. Fixed storage 322 is typically a secondary storage medium (such as a hard disk) that is slower than primary storage. In appropriate cases, the information stored by fixed storage 322 may be incorporated as virtual memory into memory 316. In some embodiments, fixed storage 322 may include network resources, such as one or more storage area networks (SAN) or network-attached storage (NAS). In some embodiments, memory 26, storage structures 27, and analysis module 29 of FIGS. 1A and 1C may be implemented using configurations such as the description of memory 316 above.

Processors 312 may be coupled to a variety of interfaces, such as, for example, graphics control 332, video interface 334, input interface 336, output interface 337, and storage interface 338, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 340 may couple processors 312 to another computer system or to network 342. Network interface 340 may include wired, wireless, or any combination of wired and wireless components. Such components may include wired network cards, wireless network cards, radios, antennas, cables, or any other appropriate components. With network interface 340, processors 312 may receive or send information from or to network 342 in the course of performing steps of some embodiments. Some embodiments may execute solely on processors 312. Some embodiments may execute on processors 312 and on one or more remote processors operating together. In some embodiments, processors 312 may be used to implement analysis module 29 of FIG. 1C and/or may perform the steps specified in instructions or code included in analysis module 29 of FIG. 1C.

In a network environment, where computer system 300 is connected to network 342, computer system 300 may communicate with other devices connected to network 342. Computer system 300 may communicate with network 342 via network interface 340. For example, computer system 300 may receive information (such as a request or a response from another device) from network 342 in the form of one or more incoming packets at network interface 340 and memory 316 may store the incoming packets for subsequent processing. Computer system 300 may send information (such as a request or a response to another device) to network 342 in the form of one or more outgoing packets from network interface 340, which memory 316 may store prior to being sent. Processors 312 may access an incoming or outgoing packet in memory 316 to process it, according to particular needs.

Some embodiments involve one or more computer-storage products that include one or more tangible, computer-readable storage media that embody software for performing one or more steps of one or more processes described or illustrated herein. In some embodiments, one or more portions of the media, the software, or both may be designed and manufactured specifically to perform one or more steps of one or more processes described or illustrated herein. In addition or as an alternative, in some embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In some embodiments, software may be machine code which a compiler may generate or one or more files containing higher-level code which a computer may execute using an interpreter.

As an example and not by way of limitation, memory 316 may include one or more tangible, non-transitory, computer-readable storage media embodying software and computer system 300 may provide particular functionality described or illustrated herein as a result of processors 312 executing the software. Memory 316 may store and processors 312 may execute the software. Memory 316 may read the software from the computer-readable storage media in mass storage device 316 embodying the software or from one or more other sources via network interface 340. When executing the software, processors 312 may perform one or more steps of one or more processes described or illustrated herein, which may include defining one or more data structures for storage in memory 316 and modifying one or more of the data structures as directed by one or more portions the software, according to particular needs. In some embodiments, memory 26, storage structures 27, and analysis module 29 of FIGS. 1A and 1C may be implemented using configurations such as the description of memory 316 above.

In some embodiments, the described processing and memory elements (such as processors 312 and memory 316) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing. In addition or as an alternative, computer system 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although several embodiments have been illustrated and described in detail, it will be recognized that modifications and substitutions are possible without departing from the spirit and scope of the appended claims.

What is claimed is:

1. A method, comprising:
identifying, using one or more processors, a plurality of characteristics of a Portable Document Format (PDF) file, wherein the plurality of characteristics comprise: a time zone, metadata, language, font type, incorrect syntax, duplicate object numbers, and an embedded executable;
determining, using the one or more computer processors, for each characteristic of the plurality of characteristics, a score corresponding to the characteristic, wherein the score for each of the characteristics is determined based on the frequency with which each characteristic occurs in a set of PDF files known to be malware and the frequency with which each characteristic occurs in a set of PDF files known not to be malware;
comparing, using the one or more computer processors, the determined scores to a first threshold; and
based at least on the comparison of the determined scores to the first threshold, determining, using the one or more processors, that the PDF file is potential malware.

2. The method of claim 1, wherein:
the method comprises comparing the determined scores to a second threshold; and
the PDF file is determined to be potential malware by determining that the determined scores are less than the second threshold and greater than the first threshold.

3. The method of claim 1, further comprising sending, in response to determining that the PDF file is potential malware, the PDF file, the plurality of characteristics, and the determined scores to a human review module for review by a human analyst.

4. The method of claim 1, wherein comparing the determined scores to the first threshold comprises comparing a weighted sum of the determined scores to the first threshold.

5. The method of claim 1, wherein the plurality of characteristics comprises existence of Javascript.

6. The method of claim 1, wherein the plurality of characteristics comprises the presence of markers between PDF objects.

7. The method of claim 1, wherein the plurality of characteristics comprises multiple PDF objects having the same object number.

8. A system, comprising:
one or more computer processors configured to:
identify a plurality of characteristics of a Portable Document Format (PDF) file, wherein the plurality of characteristics comprise: a time zone, metadata, language, font type, incorrect syntax, duplicate object numbers, and an embedded executable;
determine for each characteristic of the plurality of characteristics, a score corresponding to the characteristic, wherein the score for each of the characteristics is determined based on the frequency with which each characteristic occurs in a set of PDF files known to be malware and the frequency with which each characteristic occurs in a set of PDF files known not to be malware;
compare the determined scores to a first threshold; and
based at least on the comparison of the determined scores to the first threshold, determine that the PDF file is potential malware.

9. The system of claim 8, wherein:
the one or more processors are configured to compare the determined scores to a second threshold; and
the PDF file is determined to be potential malware by determining that the determined scores are less than the second threshold and greater than the first threshold.

10. The system of claim 8, wherein the one or more processors are configured to send, in response to determining that the PDF file is potential malware, the PDF file, the plurality of characteristics, and the determined scores to a human review module for review by a human analyst.

11. The system of claim 8, wherein the one or more processors are configured to compare the determined scores to the first threshold by comparing a weighted sum of the determined scores to the first threshold.

12. The system of claim 8, wherein the plurality of characteristics comprises existence of Javascript.

13. The system of claim 8, wherein the plurality of characteristics comprises the presence of markers between PDF objects.

14. The system of claim 8, wherein the plurality of characteristics comprises multiple PDF objects having the same object number.

15. At least one non-transitory computer-readable medium comprising instructions that, when executed by one or more processors, are configured to:
identify a plurality of characteristics of a Portable Document Format (PDF) file, wherein the plurality of characteristics comprise: a time zone, metadata, language, font type, incorrect syntax, duplicate object numbers, and an embedded executable;
determine for each characteristic of the plurality of characteristics, a score corresponding to the characteristic, wherein the score for each of the characteristics is determined based on the frequency with which each characteristic occurs in a set of PDF files known to be malware and the frequency with which each characteristic occurs in a set of PDF files known not to be malware;
compare the determined scores to a first threshold; and
based at least on the comparison of the determined scores to the first threshold, determine that the PDF file is potential malware.

16. The at least one computer-readable medium of claim 15, wherein:
the instructions are configured to compare the determined scores to a second threshold; and
the PDF file is determined to be potential malware by determining that the determined scores are less than the second threshold and greater than the first threshold.

17. The at least one computer-readable medium of claim 15, wherein the instructions are configured to compare the determined scores to the first threshold by comparing a weighted sum of the determined scores to the first threshold.

18. The method of claim 1, wherein comparing the determined scores to a first threshold includes comparing the determined scores to a first threshold, the first threshold based on a context of how the PDF file was received.

19. The system of claim 8, wherein the first threshold is based on a context of how the PDF file was received.

20. The at least one computer-readable medium of claim 15, wherein the instructions configured to compare the determined scores to a first threshold are further configured to compare the determined scores to a first threshold, the first threshold based on a context of how the PDF file was received.

* * * * *

UNITED STATES PATENT AND TRADEMARK OFFICE
CERTIFICATE OF CORRECTION

| | | |
|---|---|---|
| PATENT NO. | : 9,213,837 B2 | Page 1 of 1 |
| APPLICATION NO. | : 13/312767 | |
| DATED | : December 15, 2015 | |
| INVENTOR(S) | : Richard et al. | |

It is certified that error appears in the above-identified patent and that said Letters Patent is hereby corrected as shown below:

In the Specification

In column 10, line 43, delete "316" and insert --306--, therefor

Signed and Sealed this
Seventeenth Day of May, 2016

Michelle K. Lee
*Director of the United States Patent and Trademark Office*